United States Patent [19]

Nogai

[11] Patent Number: 4,492,547
[45] Date of Patent: Jan. 8, 1985

[54] APPARATUS FOR MANUFACTURING A CONTINUOUS SLIDE FASTENER STRINGER

[75] Inventor: Akira Nogai, Kurobe, Japan

[73] Assignee: Yoshida Kogyo K. K., Tokyo, Japan

[21] Appl. No.: 553,249

[22] Filed: Nov. 18, 1983

[30] Foreign Application Priority Data

Nov. 19, 1982 [JP] Japan .................... 57-203280

[51] Int. Cl.$^3$ .......... B29C 5/00; B29D 3/00; B29D 31/00

[52] U.S. Cl. .................... 425/111; 425/116; 425/121; 425/122; 425/129 R; 425/289; 425/545; 425/DIG. 34; 425/814

[58] Field of Search ............ 425/814, 122, 145, 150, 425/DIG. 34, 111, 117, 121, 289, 116, 129 R, 545

[56] References Cited

U.S. PATENT DOCUMENTS

| | | | |
|---|---|---|---|
| 3,097,395 | 7/1963 | Yoshida | 425/122 |
| 4,222,723 | 9/1980 | Sawada | 425/814 |
| 4,226,577 | 10/1980 | Sawada | 425/814 |
| 4,336,220 | 6/1982 | Takahashi | 425/111 |
| 4,345,889 | 8/1982 | Sizemore | 425/121 |
| 4,362,487 | 12/1982 | Takahashi | 425/122 |
| 4,406,849 | 9/1983 | Takahashi et al. | 425/DIG. 34 |

FOREIGN PATENT DOCUMENTS 5328309 8/1978 Japan .
5510733 1/1980 Japan .

Primary Examiner—Willard E. Hoag
Attorney, Agent, or Firm—Hill, Van Santen, Steadman & Simpson

[57] ABSTRACT

An apparatus for manufacturing a continuous slide fastener stringer including a row of injection-molded coupling elements secured to a stringer tape along a longitudinal edge thereof, includes a pair of fixed and movable mold members through which the stringer tape is fed by a tape advancing means, and a pair of upper and lower tape shifters mounted on the movable mold member for moving the stringer tape between a first position in which a part or portion of the stringer tape lies flatwise on a mold surface of the movable mold member and a second position in which the tape's part is spaced from the mold surface and held out of interference with a feeler projecting from the mold surface of the movable mold member. During the advancing movement of the movable mold member toward the fixed mold and in timed relation to the stringer-tape advancing means, the tape shifters are movable with respect to the movable mold member to place the tape's part in the first position.

6 Claims, 4 Drawing Figures

APPARATUS FOR MANUFACTURING A CONTINUOUS SLIDE FASTENER STRINGER

BACKGROUND OF THE INVENTION

1. Field of the Invention:

The present invention relates to an apparatus for manufacturing a continuous slide fastener stringer including a stringer tape and a row of injection-molded coupling elements secured to the stringer tape along a longitudinal edge thereof.

2. Prior Art:

One example of such apparatus as described is disclosed in the Japanese Patent Publication (Kokoku) No. 53-28309 published on Aug. 14, 1978. The disclosed apparatus includes a pair of fixed and movable mold members having a predetermined number of cavities, and a tape feeder disposed downstream of the movable mold member for intermittently advancing successive parts of a stringer tape one at a time, one of successive parts of the tape extending through the mold members at an angle to confronting mold surfaces of the latter. The stringer tape's part thus held is liable to be displaced out of alignment with the mold cavities as the movable mold member is moved to its fully closed position. A beaded, element-supporting edge of such misaligned tape's part is partly deformed or otherwise crushed by the mold surfaces, and a row of injection-molded coupling elements secured to such crushed element-supporting edge cannot perform a requisite function.

Another apparatus disclosed in Japanese Utility Model Laid-open Publication (Kokai) No. 55-10733 published on Jan. 23, 1980 comprises a feeler projecting from a mold surface on a fixed mold member toward a mating mold surface on a movable mold member and engageable with the trailing end of a group of injection-molded coupling elements secured to a portion of a stringer tape to position a succeeding part of the stringer tape with respect to the mold members. The disclosed apparatus, however, has no means for moving the stringer tape between a position in which the tape is spaced from the mold surface and held out of interference with the feeler, and a second position in which the tape lies flatwise on the mold surface. With this arrangement, the movement of the movable mold member toward the fixed mold member must be temporariry interrupted for a period during which time the stringer tape is fed in the a reverse direction until the trailing end of the previous injection-molded coupling elements abuts against the feeler. The apparatus thus constructed is difficult to operate at a relatively high speed.

SUMMARY OF THE INVENTION

An apparatus for securing a row of injection-molded coupling element to a continuous stringer tape along a longitudinal edge includes a feeler disposed on a movable mold member adjacent to a trailing end of a series of mold cavities defined in the movable mold member and projecting from a mold surface of the movable mold member toward a mating mold surface of a fixed mold member toward and away from which the movable mold member is movable. A pair of first and second tape shifters is mounted on the movable mold member respectively upstream and downstream of the same and movable relative to the movable mold member to move one of successive parts of the stringer tape between a first position in which the one part of the stringer tape lies flatwise on the mold surface of the movable mold member and a trailing end of the previous injection-molded coupling elements engages the feeler, and a second position in which the one part of the stringer tape is spaced away from the mold surface of the movable mold member and is held out of interference with the feeler. The first tape shifter carries thereon a tension roll for supplying the tape with a constant tension and for feeding the stringer tape in a reverse direction, a roll holder engageable with the tension roll for preventing the tape from being tensioned by said tension roll, and a brake device upstream of said tension roll for applying a braking force to the stringer tape.

It is an object of the present invention to provide an apparatus for manufacturing a continuous slide fastener stringer including a row of injection-molded coupling elements secured to a continuous stringer tape along a longitudinal edge at a rapid rate of production.

Another object of the present invention is to provide an apparatus by which a stringer tape can be properly positioned on a mold surface of a movable mold member and hence is prevented from being deformed at a longitudinal edge thereof by mating mold surfaces of the mold members.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
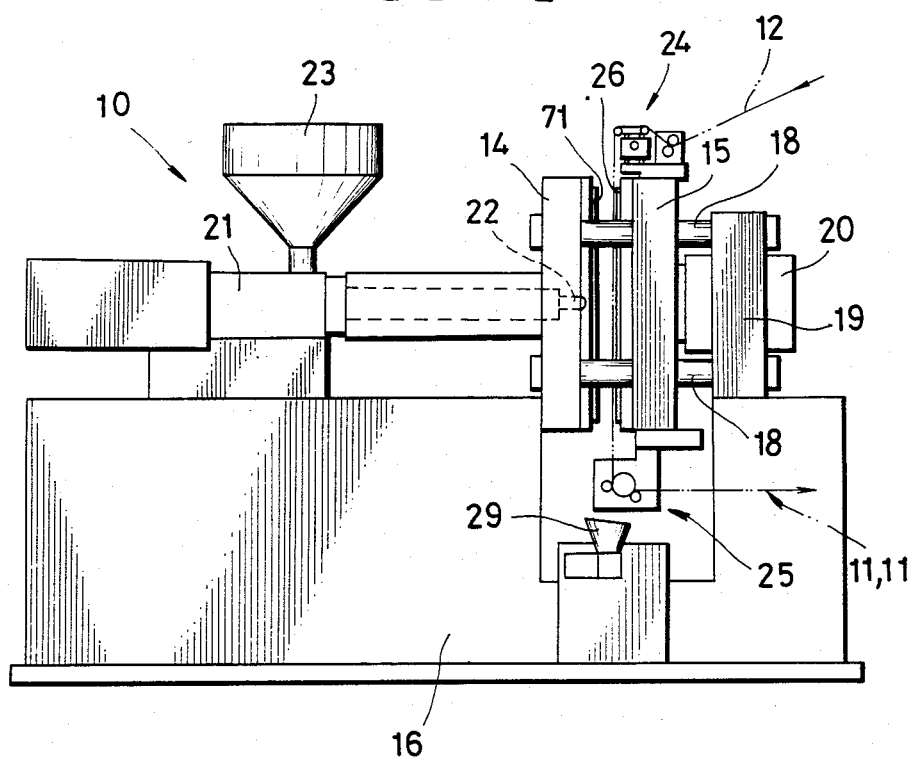
FIG. 1 is a schematic front elevational view of an apparatus embodying the present invention.
Figure 4:
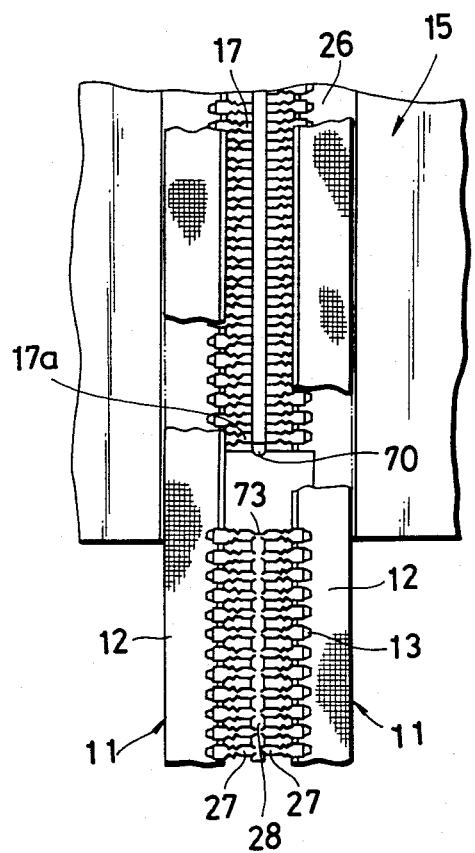
FIG. 4 is an enlarged fragmentary view of a movable mold member with a pair of slide fastener stringers, showing the manner in which a pair of rows of injection-molded coupling elements are formed on a pair of stringer tapes along their respective inner longitudinal edges.

FIG. 1 shows an apparatus 10 for manufacturing a pair of continuous slide fastener stringers 11, 11 (only one of which is described here for clarity) each including a stringer tape 12 and a row of injection-molded coupling elements 13 (FIGS. 2 and 4) secured to the stringer tape 12 along a longitudinal edge therof.

The apparatus 10 comprises a pair of relatively movable mold halves or members 14, 15 supported on frame 16 and defining a predetermined number of mold cavities 17 (FIG. 4), and means (described below) disposed both upstream and downstream of the mold members 14, 15 for intermittently advancing successive parts or portions of the stringer tape 12 through the mold members 14, 15. The mold member 14 is fixed on the frame 16 while the mold member 15 is slidably mounted on a pair of tie rods 18 extending horizontally between the fixed mold member 14 and an upstanding support 19 fixed on the frame 16. An actuator or fluid-actuated cylinder 20 is mounted on the support 19 and is operatively connected to the movable mold member 15. Thus, the movable mold 15 slides on the tie rods 18 toward and away from the fixed mold member 14 upon energization and de-energization of the cylinder 20. The frame 16 also supports thereon an injector 21 having a nozzle 22 opening to a sprue (not shown) in the fixed mold member 14 for injecting melted synthetic resin material into the mold cavities 17, while the mold members 14, 15 are fully closed. A hopper 23 is mounted on the injector 21 for supplying the latter with solid synthetic resin material.

The apparatus 10 further comprises a pair of upper and lower tape shifters 24, 25 respectively disposed upstream and downstream of the movable mold member 15 for moving one of the successive parts or portions of the stringer tape 12 between a first position in which the part of the stringer tape 12 lies on a mold surface 26 of the movable mold member 15 with a trailing end of the previous injection-molded coupling elements engaging a feeler (described below), and a second position (FIGS. 1 and 2) in which the stringer tape's part is spaced from the mold surface 26 by a predetermined distance (described below). A pair of gate portions 27 and a runner portion 28 (both shown in FIG. 4) of the injection-molded coupling elements 13 are removed and then fall into a hopper 29 disposed below the movable mold member 15, as the stringer tape 12 passes through the lower tape shifter 25.

Figure 2:
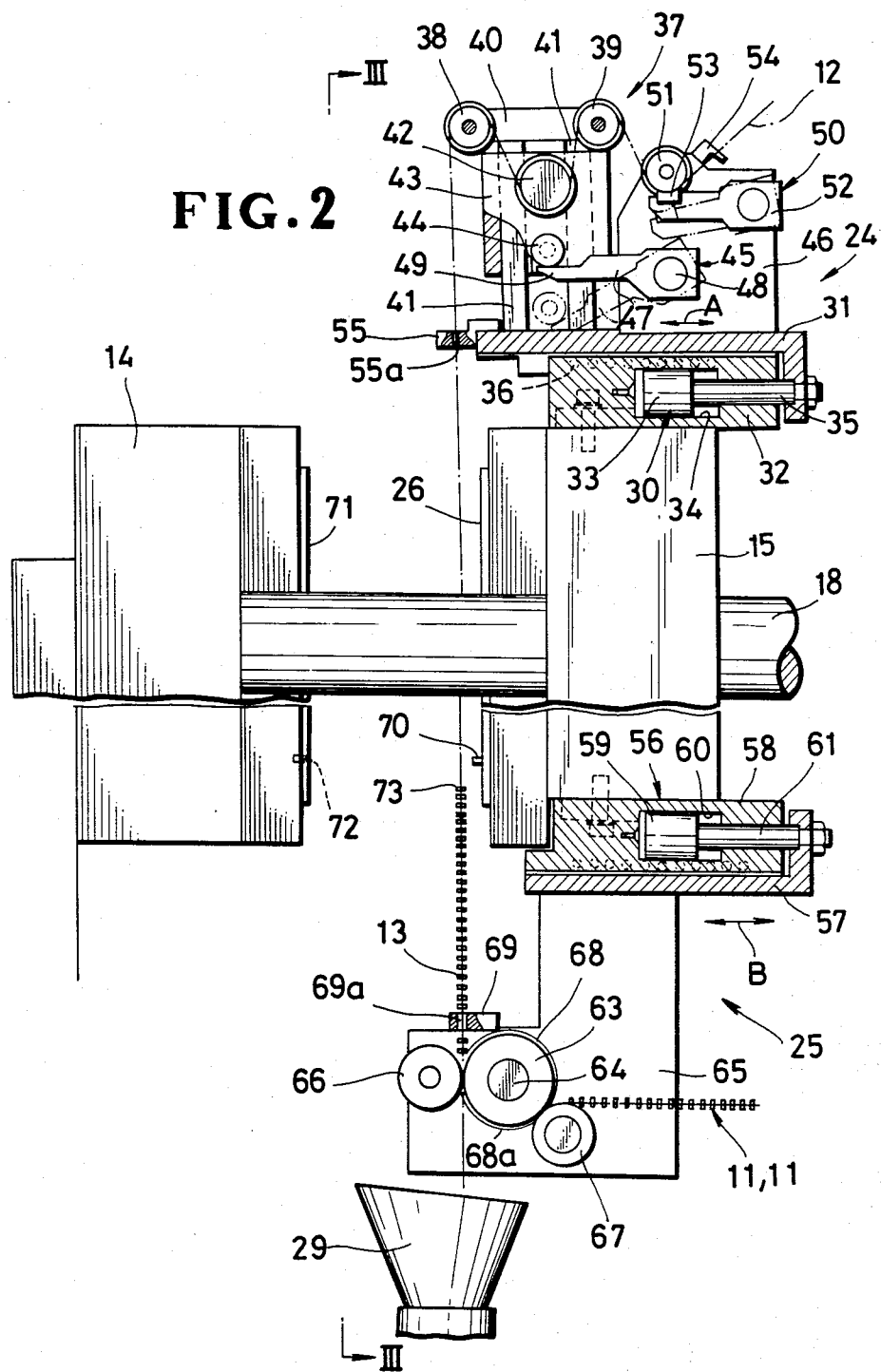
FIG. 2 is an enlarged fragmentary front elevational view, partly in cross section, of a portion of the apparatus of FIG. 1.
Figure 3:
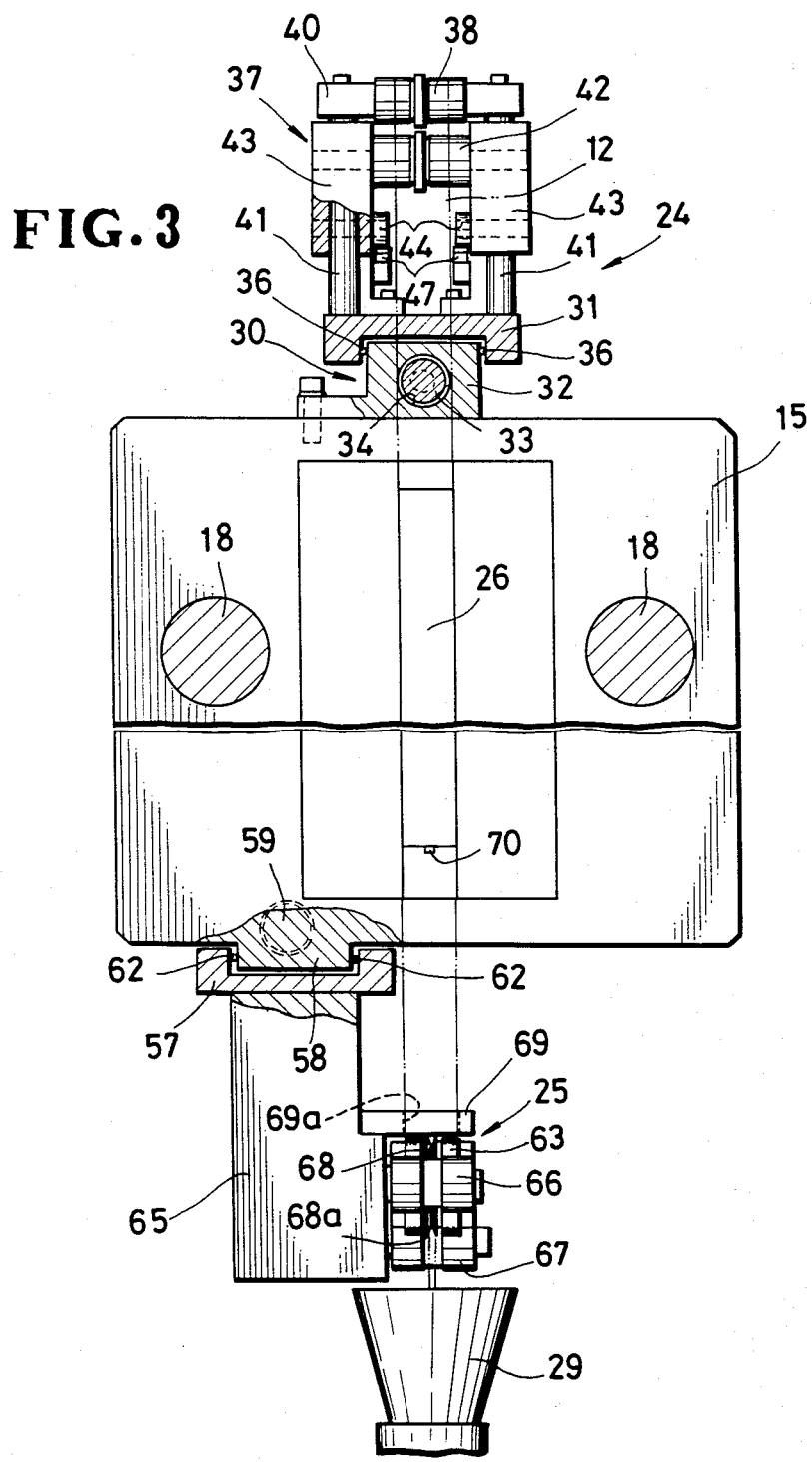
FIG. 3 is a cross-sectional view taken along line III—III of FIG. 2.

As shown in FIGS. 2 and 3, the upper tape shifter 24 includes an actuator 30 mounted on the movable mold member 15, and a base 31 operatively connected to the actuator 30 and movable relative to the movable mold member 15 in opposite directions indicated by the arrowheads A (FIG. 2) upon operation of the actuator 30. More specifically, the actuator 30 comprises a fluid-actuated cylinder inclucing a cylinder block 32 secured to an upper end of the movable mold member 15, a piston 33 movable within a cylinder bore 34, and a piston rod 35 connected at one end to the piston 33 and at the opposite end to the base 31. The base 31 is slidably mounted on the cylinder block 32 via a series of linear-motion bearings 36.

The upper stringer-tape advancing means includes tensioning means 37 disposed upstream of the movable mold member 15 for supporting the stringer tape 12 with a constant tension. The tensioning means 37 includes a pair of horizontally spaced guide rolls 38, 39 rotatable on a horizontal bracket 40 supported on upper ends of a pair of vertical guide posts 41, and a rotatable tension roll 42 hung on the stringer tape 12 between the guide rolls 38, 39. The tension roll 42 is rotatably mounted on a support 43 slidably mounted on the guide posts 41. The tension roll 42 and the support 43 are thus movable between a raised position (FIG. 2 and 3) and a lowered position, keeping the tension of the stringer tape 12 constant. The tension roll 42 moves the stringer tape 12 in the reverse direction as it moves downwardly by its own weight. A roller 44 is mounted on the support 43 below the tension roll 42.

A roll holder 45 for holding the tension roll 42 selectively in its raised or lowered position is mounted on a vertical bracket 46 supported on the base 31. The holder 45 includes a holding lever 47 fixed to a horizontal shaft 48 pivotably mounted on the bracket 46, the lever 47 having a distal end 49 supporting thereon the roller 44. The shaft 48 is driven by a suitable drive means (not shown) to angularly move the lever 47 between a raised position (solid line in FIG.2) and a lowered position (phantom line in FIG. 2) with the roller 44 carried on the lever 47. Thus, the support 43 and hence the tension roll 42 is selectively held in its raised or lowered position.

As shown in FIG. 2, a braking device 50 is disposed upstream of the tensioning means 37 for applying a braking force to the stringer tape 12. The braking device 50 includes a guide roll 51 rotatable on the bracket 46 for guiding the stringer tape 12 therearound, and a brake lever 52 rockably supported at one end thereof on the bracket 46 and having at the opposite end a brake shoe 53. Upon rocking movement of the braking lever 52, the brake shoe 53 and the guide roll 51 are brought into and out of locking engagement of the stringer tape 12 extending therebetween. A tape guide 54 is mounted on the bracket 46 for guiding the stringer tape 12 to the guide roll 51. Another tape guide 55 is mounted on the guide roll 38 and the mold members 14, 15. The tape guide 55 has a vertical guide slot 55a extending parallel to the mold surface 26 for the passage therethrough of the stringer tape 12.

As shown in FIGS. 2 and 3, the lower tape shifter 25 includes an actuator 56 mounted on the movable mold member 15, and a base 57 operatively connected to the actuator 56 and movable relative to the movable mold member 15 in opposite directions indicated by the arrowheads B (FIG. 2) upon operation of the actuator 56. More specifically, the actuator 56 comprises a fluid-actuated cylinder including a cylinder block 58 secured to a lower end of the movable mold member 15, a piston 59 movable within a cylinder bore 60, and a piston rod 61 connected at one end to the piston 59 and at the opposite end to the base 57. The base 57 is slidably mounted on the cylinder block 58 via a series of linear-motion bearings 62.

The lower stringer-tape advancing means further includes a drive roll 63 fixed to a drive shaft 64 rotatably mounted on a vertical bracket 65 depending from the base 57. The drive shaft 64 is driven by a suitable drive means (not shown) to positively rotate the drive roll 63 in opposite directions. A pair of spaced pinch rolls 66, 67 presses the stringer tape 12 against the periphery of the drive roll 63 to move the stringer tape 12.

A disc cutter 68 is secured to the shaft 64 and has a cutting edge 68a projecting beyond the periphery of the drive roll 63. The cutter 68 thus severs the gate portions 27 and the runner portion 28 of the injection-molded coupling elements 13 as the stringer tape 12 passes through between the rolls 63, 66. The gate and runner portions 27, 28 thus removed fall into the hopper 29.

A stringer guide 69 is disposed immediately above the nipping point between the feed roll 63 and the pinch roll 66. The stringer guide 69 has a vertical guide channel 69a extending in alignment with the guide slot 55a in the tape guide 55 for the passage therethrough of the slide fastener stringer 11 so that the stringer tape 12 extends parallel to the mold surface 26 between the guides 55, 69.

A feeler 70 is disposed on the movable mold member 15 adjacent to the lowermost (leading) mold cavity 17a (FIG. 4), and projects from the mold surface 26 toward a mating mold surface 71 on the fixed mold member 14. The fixed mold member 14 has an opening 72 for receiving the feeler 70 when the mold members 14, 15 are fully closed. The feeler 70 engages the trailing end couping element 73 to stop reverse feeding of the stringer tape 12 by the rolls 63, 66 as described below. This feeler 70 is positioned such that the injection-molded coupling elements 13 have a uniform element pitch across two successive rows of such injection-molded coupling elements 13. The fluid-actuated cylinders 30, 56 have the same stroke which is larger than the length of the portion of the feeler 70 which projects from the mold surface 26, and are operative in synchronism with each other to extend or retract their piston rods 35, 61 at the same time.

The apparatus 10 operates as follows. For the purpose of illustration, the operation begins from the condition shown in FIG. 2 in which the movable mold member 15 is held in the fully opened position; the advancing movement of the stringer tape 12 is stopped with the trailing end 73 of the previous injection-molded coupling elements 13 slightly beyond the feeler 70; the tension roll 42, which has been moved upwardly under an increased tape tension during the advancing movement of the tape 12, is held in its raised position by the holding lever 47 which has been actuated to angularly move from the lowered position (phantom line) to the raised position (solid line) simultaneously with the stoppage of the tape feed; and the brake lever 52 is actuated to pivot in the clockwise direction simultaneously with the stoppage of the tape feed to thereby lock the stringer tape 12 betweeen the guide roll 51 and the brake shoe 53.

In response to the stoppage of the tape feed, a detector (not shown) sends a signal to the actuators 30, 56 whereupon the actuators 30, 56 are energized to simultaneously retract (or move rightward) the bases 31, 57 of the upper and the lower tape shifters 24, 25 so that a length of the stringer tape 12 is forced by the guides 55, 69 to lie flatwise on the molding surface 26 of the movable mold member 15. Simultaneously, the movable mold member 15 is moved toward the fixed mold member 14 by the cylinder 20 energized by a signal from the detector.

In response to the completion of the retracting movement of the bases 31, 57 by the actuators 30, 56, the holding lever 47 is actuated to angularly move about the shaft 48 from the raised position (solid line) to the lowered position (phantom line), thereby allowing the support 43 and hence the tension roll 42 to move downwardly toward the base 31 by its own weight. Downward movement of the tension roll 42 causes the tape 12 to move in the reversed direction, during the time of which the drive roll 63 is reversely driven at such a speed that the tension roll 42 can apply a tension to the tape 12 between the braking device 50 and the drive and pinch rolls 63, 66. The reverse feeding of the tape 12 is stopped when the trailing end 73 of the injection-molded coupling elements 13 abuts against the feeler 70. At this time, the drive roll 63 ceases rotating in the reversed or clockwise direction. Thus one of successive parts or portions of the stringer tape 12 is properly placed flatwise on the mold surface 26 of the movable mold member 15. Slightly thereafter or ideally at substantially the same time, the movable mold member 15 is brought into the fully closed position.

With this condition, melted synthetic resin material is injected into the mold cavities 17 in the mold members 14, 15 to form a predetermined number of the coupling elements 13. The injection-molded coupling elements 13 are cooled for a predetermined period of time, during the time of which the bases 31, 57 of the tape shifters 24, 25 are moved by the actuators 30, 56 to the position of FIG. 2. In order to prevent the stringer tape 12 from being unduly stretched during the forward movement of the bases 31, 57, the drive roll 63 is reversely driven by a limited angle. An increased tension on the stringer tape 12 cause the tension roll 42 to slightly move upwardly.

Upon expiration of the predetermined cooling time, the movable mold member 15 is moved from the fully closed position to the fully opened position (FIG. 2), at which time the injection-molded coupling elements 13 are ejected out of the mold cavities 17 by means of a plurality of ejector pins (not shown). Simultaneously with the ejecting of the injection-molded coupling elements 13, the brake lever 52 is pivotally moved from the locking position (solid line) to the releasing position (phantom line), thereby releasing the tape 12 from the locking engagement with the guide roll 51 and the brake shoe 53. At the same time, the drive roll 63 is driven to advance the stringer tape 12 for a predetermined distance until a trailing end 73 of the coupling elements 13 just molded is detected by the detector. The runner and gate portions 28, 27 (FIG. 4) are removed by the cutter 68 as the stringer tape 12 passes throught between the drive and pinch rolls 63, 64, as shown in FIG. 2. The runner and gate portions 28, 27 thus removed fall into the hopper 29. The tension roll 42 is moved upwardly under an increased tape tension during the advancing movement of the tape 12. Upon stoppage of the tape's advancing movement, the holding lever 47 is moved to hold the tension roll 42 in the raised position and the braking device 50 locks the stringer tape 12. Thus, one cycle of operation for one of successive parts or portion of the stringer tape 12 has been completed. The same operation is repeated for a succeeding part of the stringer tape 12.

Thus, the stringer tape can be positioned by the tape shifters on the mold surface of the movable hold member during the advancing movement of the movable hold member toward the fixed mold member, with the result that a cycle time of the apparatus is shortened. As the tape shifters move in timed relation to the tape advancing means, the stringer tape is positioned accurately with respect to the mold cavities.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. An apparatus for manufacturing a continuous slide fastener stringer including a continuous stringer tape and a row of injection-molded coupling elements secured to the stringer tape along a longitudinal edge thereof, said apparatus comprising:

(a) a frame;

(b) a pair of fixed and movable mold members supported on said frame and defining a series of mold cavities, said movable mold member being reciprocably movable between an advanced position in which said mold members are fully closed to hold one of successive part of the stringer tape, and a retracted position in which said mold members are fully opened for the passage therethrough of the stringer tape, said mold members having a pair of mating mold surfaces, respectively, (c) a feeler disposed on said movable mold member adjacent to a trailing end of said mold cavities and projecting from the mold surface of said movable mold member toward said mold surface of said fixed mold member for detecting a trailing end of the injection-molded coupling elements;

(d) means disposed upstream and downstream of said mold members for intermittently advancing the stringer tape through said mold members;

(e) a pair of first and second tape shifters mounted on said movable mold member respectively upstream and downstream of said movable mold member and movable, in timed relation to said stringer-tape advancing means, with respect to said movable mold member to move said one part of the stringer tape between a first position in which said one part of the stringer tape lies flatwise on said mold surface of said movable mold member and said trailing end of the injection-molded coupling elements is engageable with said feeler, and a second position in which said one part of the stringer tape is spaced away from the last-mentioned mold surface and is held out of interference with said feeler; and (f) said stringer-tape advancing means comprising a pair of drive and pinch rolls rotatably mounted on said second tape shifter, said drive roll being drivable to rotate in opposite directions, a braking device mounted on said first tape shifter for applying a braking force to said stringer tape, a tension roll vertically movably supported on said first tape shifter downstream of said braking device and carried on the stringer tape extending between said braking device and said drive and pinch rollers, and a roll holder mounted on said first tape shifter for preventing the downward movement of said tension roll.

2. An apparatus according to claim 1, including a disc cutter associated with said drive roll for corotation therewith and having a cutting edge projecting beyond the periphery of said drive roll.

3. An apparatus according to claim 1, said braking device including guide roll rotatable on said base of said first shifter and guiding the stringer tape therearound, and a brake lever rockingly movable toward and away from said guide roll and having a brake shoe engageable with the tape extending around said guide roll to lock the same between said guide roll and said brake shoe.

4. An apparatus according to claim 1, each of said tape shifters including a power-driven actuator fixedly mounted on said movable mold member, a base operatively connected to said actuator and receiprocably movable perpendicularly to said mold surface of said movable mold member upon engergization and de-energization of said actuator, and means mounted on said base for guiding the stringer tape to extend in a plane parallel to said mold surface of said movable mold member.

5. An apparatus according to claim 4, said actuator comprising a fluid-actuated cylinder including a cylinder block secured to said movable mold member and a piston rod, said base being mounted on said cylinder block via linear-motion bearings and connected to said piston rod.

6. An apparatus according to claim 4, said-stringer tape advancing means including at least one vertical guide post extending from said base of said first tape shifter, a support slidably mounted on said guide post, a pair of horizontally spaced guide rolls rotatably supported on said guide post above said support, said tension roll being rotatably supported on said support and being adapted to be hung on the stringer tape between said guide rolls, and a roller rotatable on said support, said roll holder comprising a rockingly movable holding lever pivoted at one end on the last-mentioned base and having the opposite end held in engagement with said roller.

* * * * *